US006874999B2

(12) United States Patent
Dai et al.

(10) Patent No.: US 6,874,999 B2
(45) Date of Patent: Apr. 5, 2005

(54) MICROPUMPS WITH PASSIVE CHECK VALVES

(75) Inventors: Xunhu Dai, Gilbert, AZ (US); Manuel Oliver, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/222,735

(22) Filed: Aug. 15, 2002

(65) Prior Publication Data

US 2004/0033146 A1 Feb. 19, 2004

(51) Int. Cl.⁷ ............................................... F04B 17/00
(52) U.S. Cl. ................. 417/413.2; 417/536; 251/149.9; 251/218; 251/493.1; 251/849; 251/859; 604/164.05; 604/246; 604/164.06
(58) Field of Search ............................... 417/413.2, 536; 251/149.1, 149.8, 149.9; 137/215, 217, 218, 493.1, 843, 859, 846, 847, 849; 604/164.05, 167.04, 246

(56) References Cited

U.S. PATENT DOCUMENTS

| | | | | |
|---|---|---|---|---|
| 3,159,176 A | * | 12/1964 | Russell et al. ............ | 137/493.1 |
| 3,941,149 A | * | 3/1976 | Mittleman ................ | 137/493.1 |
| 4,030,495 A | | 6/1977 | Virag | |
| 4,084,606 A | * | 4/1978 | Mittleman .................... | 137/102 |
| 5,669,764 A | | 9/1997 | Behringer et al. | |
| 5,759,014 A | | 6/1998 | Van Lintel | |
| 5,876,187 A | * | 3/1999 | Forster et al. ............... | 417/322 |
| 6,044,859 A | * | 4/2000 | Davis ........................ | 137/15.19 |
| 6,072,509 A | * | 6/2000 | Wen et al. ................. | 346/140.1 |
| 6,092,551 A | * | 7/2000 | Bennett ........................ | 137/846 |
| 6,116,866 A | * | 9/2000 | Tomita et al. ............ | 417/413.2 |
| 6,120,124 A | * | 9/2000 | Atobe et al. ................... | 347/15 |
| 6,164,933 A | * | 12/2000 | Tani et al. ................ | 417/413.2 |
| 6,231,177 B1 | * | 5/2001 | Cherukuri et al. .......... | 347/105 |
| 6,425,740 B1 | | 7/2002 | Jacobsen et al. | |
| 6,431,212 B1 | * | 8/2002 | Hayenga et al. ............... | 137/85 |
| 6,453,940 B1 | * | 9/2002 | Tipton et al. ............ | 137/493.9 |
| 6,527,011 B1 | * | 3/2003 | Mantz ......................... | 137/848 |

FOREIGN PATENT DOCUMENTS

| | | |
|---|---|---|
| DE | 4239464 A1 | 5/1994 |

\* cited by examiner

*Primary Examiner*—Denise L. Esquivel
*Assistant Examiner*—Emmanuel Sayoc

(57) ABSTRACT

An exemplary device and method for microfluidic transport is disclosed as providing inter alia a passive check valve (100), a fluid inlet channel (210), a fluid outlet channel (220) and a pumping cavity (240). The fluid inlet channel (210) is generally configured to flow a fluid through the check valve (100). The check valve (100) generally provides substantially passive means for preventing or otherwise decreasing the incidence of purged outlet fluid re-entering either the pumping cavity (240) or the fluid inlet channel (210). Accordingly, the reduction of backflow generally tends to enhance overall pumping performance and efficiency. Disclosed features and specifications may be variously controlled, adapted or otherwise optionally modified to improve micropump operation in any microfluidic application. Exemplary embodiments of the present invention representatively provide for substantially self-priming micropumps that may be readily integrated with, for example, existing portable ceramic technologies for the improvement of device package form factors, weights and other manufacturing and/or device performance metrics.

13 Claims, 1 Drawing Sheet

MICROPUMPS WITH PASSIVE CHECK VALVES

FIELD OF INVENTION

The present invention relates to micropumps, and more particularly, in one representative and exemplary embodiment, to piezoelectrically actuated micropumps having passive check valves for improved performance and efficiency in microfluidic applications.

BACKGROUND

Development of microfluidic technology has generally been driven by parallel ontological advancements in the commercial electronics industry with an ever-increasing demand for sophisticated devices having reduced part counts, weights, form factors and power consumption while improving or otherwise maintaining overall device performance. In particular, advancement of microfluidic technology has met with some success in the areas of packaging and the development of novel architectures directed to achieving many of these aims at relatively low fabrication cost.

The development of microfluidic systems, based on for example, multilayer laminate substrates with highly integrated functionality, have been of particular interest. Monolithic substrates formed from laminated ceramic have been generally shown to provide structures that are relatively inert or otherwise stable to most chemical reactions as well as tolerant to high temperatures. Additionally, monolithic substrates typically provide for miniaturization of device components, thereby improving circuit and/or fluidic channel integration density. Potential applications for integrated microfluidic devices include, for example, fluidic management of a variety of Microsystems for life science and portable fuel cell applications. One representative application includes the use of ceramic materials to form microchannels and/or cavities within a ceramic structure to define, for example, a monolithic micropump device.

Conventional pumps and pumping designs have been used in several applications; however, many of these are generally too cumbersome and complex for application with microfluidic systems. For example, existing designs typically employ numerous discrete components externally assembled or otherwise connected together with plumbing and/or component hardware to produce ad hoc pumping systems. Accordingly, conventional pump designs have generally not been regarded as suitable for integration with portable ceramic packages, microfluidic technologies or in various applications requiring, for example, reduced form factor, weight or other desired performance and/or fabrication process metrics. Moreover, previous attempts with integrating microfluidic pumps in monolithic substrates have met with considerable difficulties in producing reliable fluidic connections and/or hermetic seals capable of withstanding manufacturing processes and/or operational stress while maintaining or otherwise reducing production cost. Accordingly, despite the efforts of prior art pump designs to miniaturize and more densely integrate components for use in microfluidic systems, there remains a need for micropumps having integrated check valves suitably adapted for incorporation with, for example, a monolithic package.

SUMMARY OF THE INVENTION

In various representative aspects, the present invention provides a system and method for fluid transport in microfluidic systems. A representative design is disclosed as comprising a fluid inlet cavity, a fluid outlet cavity, a passive check valve substantially enclosed within each of the cavities, and means for moving fluid through the device. An integrated micropump, in accordance with one embodiment of the present invention, may be formed utilizing multilayer ceramic technology in which passive check valves are integrated into a ceramic structure; however, the disclosed system and method may be readily and more generally adapted for use in any fluid transport system. For example, the present invention may embody a device and/or method for providing integrated pumping and/or valving systems for use in fuel cell fuel delivery and/or partitioning applications.

One representative advantage of the present invention would allow for improved process control and manufacturing of integrated micropump systems at substantially lower cost. Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

Figure 1:
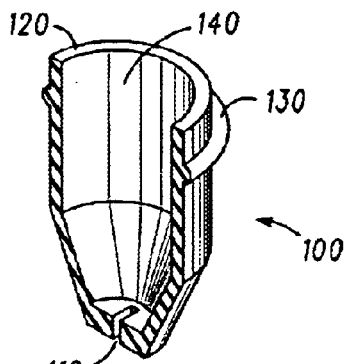
FIG. 1 depicts a cut-away section of a representative "duck-bill" passive check valve in accordance with an exemplary embodiment of the present invention.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

The following descriptions are of exemplary embodiments of the invention and the inventors' conceptions of the best mode and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system and/or method for fluid transport. As used herein, the terms "fluid", "fluidic" and/or any contextual, variational or combinative referent thereof, are generally intended to include anything that may be regarded as at least being susceptible to characterization as generally referring to a gas, a liquid, a plasma and/or any matter, substance or combination of compounds substantially not in a solid or otherwise effectively immobile condensed phase. As used herein, the terms "inlet" and "outlet" are generally not used interchangeably. For example, "inlet" may generally be understood to comprise any cross-sectional area or component feature of a device, the flux through which tends to translate fluid from a volume element substantially external to the device to a volume element substantially internal to the device; whereas "outlet" may be generally understood as referring to any cross-sectional area or component feature of a device, the flux through which tends to translate fluid from a volume element substantially internal to the device to a volume element substantially external to the device. On the other hand, as used herein, the terms "liquid" and "gas" may generally be used interchangeably and may also be understood to comprise, in generic application, any fluid and/or any translationally mobile phase of matter. As used herein, the term "purged", as well as any contextual or combinative referent or variant thereof, is generally intended to include any method, technique or process for moving a volume element of fluid through the outlet of a device so as to dispose or otherwise positionally locate the "purged" volume element external to the device. Additionally, as used herein, the terms "valve" and "valving", as well as any contextual or combinative referents or variants thereof, are generally intended to include any method, technique, process, apparatus, device and/or system suitably adapted to control, affect or otherwise parameterize fluid flow scalar quantities (e.g., volume, density, viscosity, etc.) and/or fluid flow vector quantities (i.e., direction, velocity, acceleration, jerk, etc.). Additionally, as used herein, the terms "pump" and "pumping", or any contextual or combinative referents or variants thereof, are generally intended to include any method, technique, process, apparatus, device and/or system suitably adapted to flow or otherwise translate a fluid volume element from a first location to a second location.

A detailed description of an exemplary application, namely a system and method for pumping a fluid in an integrated microfluidic package is provided as a specific enabling disclosure that may be readily generalized by skilled artisans to any application of the disclosed system and method for microfluidic transport in accordance with various embodiments of the present invention. Moreover, skilled artisans will appreciate that the principles of the present invention may be employed to ascertain and/or realize any number of other benefits associated with fluid transport such as, but not limited to: improvement of pumping efficiency; reduction of device weight; reduction of device form factor; improved sample loading in microfluidic assays; improvement in sample throughput; sample multiplexing and/or parallel sample processing; integration with micro-array techniques and/or systems; microfluidic sample transport; pumping of fuel and/or fuel components in a fuel cell system and/or device; and any other applications now known or hereafter developed or otherwise described in the art.

In one representative application, in accordance with an exemplary embodiment of the present invention, a passive check valve 100, as generally depicted in FIG. 1, is disclosed for application with a microfluidic pump. Check valve 100 generally comprises a valve housing 120 for providing a path for fluid transport from inlet opening 140 to outlet opening 110 where outlet fluid may subsequently be purged. Inlet opening 140, in certain representative embodiments, may include features to control the effective magnitude of cross-sectional area presented for fluid acceptance in order to at least partially control or otherwise parameterize fluid flux through said inlet opening 140 and/or valve housing 120 and/or outlet opening 110. For example, inlet opening 140 and/or valve housing 120 may comprise a taper, a flare, a constriction, a plurality of corrugations, a bend, a pinch, an oblique plane of fluid acceptance (e.g., wherein inlet opening facial alignment generally may be other than normal to the instantaneous vector of fluid flow) or such other means, features and/or methods now known, subsequently developed or otherwise hereafter described in the art.

Outlet opening 110 generally comprises passive means for substantially preventing or otherwise controlling or restricting the backflow of purged outlet fluid into valve housing 120. For example, outlet opening 110 may comprise features (i.e., a "slit"; as representatively depicted in FIG. 1) for effectively dilating outlet opening 110 when the flow vector (e.g., the direction of fluid pressure; also termed the "fluid transport gradient") corresponds to translation of fluid volume elements away from inlet opening 140 through valve housing 120 toward outlet opening 110. Additionally, outlet opening 110, in accordance with representative aspects of the present invention, conjunctively provides for effective constriction of outlet opening 110 when the fluid transport gradient corresponds to translation of fluid volume elements away from outlet opening 110 through valve housing 120 toward inlet opening 140 (e.g., "backflow").

One such implementation of the present invention is depicted in the embodiment representatively illustrated in FIG. 1, wherein outlet opening 110 comprises a slit. Skilled artisans will appreciate that the passive check valve 100 depicted in FIG. 1 may also be characterized as belonging to a general class of valves typically referred to as "duck-bill" type valves. Other means for providing substantially passive valving function, such as, for example: a plunger, a shuttle, a rotary stop-cock, a flap, a one-way flow gate or any other device feature, method or means for substantially passive valving now known, subsequently developed or hereafter described in the art may be alternatively, conjunctively or sequentially used. Skilled artisans will appreciate that the term "passive", as it may refer to valving devices and/or function, generally connotes the ability of a valve and/or valve device feature so characterized, to actuate the operation of constriction and/or dilation of fluid inlet acceptance and/or fluid outlet purging in effective correspondence to the forces nominally inherent to the translation of fluid volume elements through the valve device. That is to say, when the fluid flow is in a first direction, the fluidic forces operate to actuate the valve into a first conformation (i.e., substantially open); and, when the fluid flow is in a second direction (e.g., for a binary valve, generally given as the "opposite direction"), the fluidic forces operate to actuate the valve into a second conformation (i.e., substantially closed).

In various exemplary embodiments, passive check valve 100 may be fabricated from silicone, silicone-based rubber, rubber, polymer or such other materials whether now known or subsequently discovered or otherwise hereafter described in the art. In an exemplary application where passive check valve 100 comprises a "duck-bill" type valve, as generally depicted, for example, in FIG. 1, the passive check valve may comprise a silicone-based rubber material. Additionally, check valve housing 120 may optionally comprise a substantially annular retaining ring 130 for securing or otherwise at least partially immobilizing check valve 100a within a device package substrate 200. See, for example, FIG. 2. Various other means for retaining, localizing or otherwise disposing check valves according to the present invention with respect to microfluidic channels may be used and/or other package features. For example, the following retaining means may be conjunctively, alternatively or sequentially employed: adhesives, organic epoxies, press-fit clips, solder, clamps, adaptors and/or such other retention, connection or attachment devices, means and/or methods, whether now known or otherwise hereafter described in the art.

Figure 2:
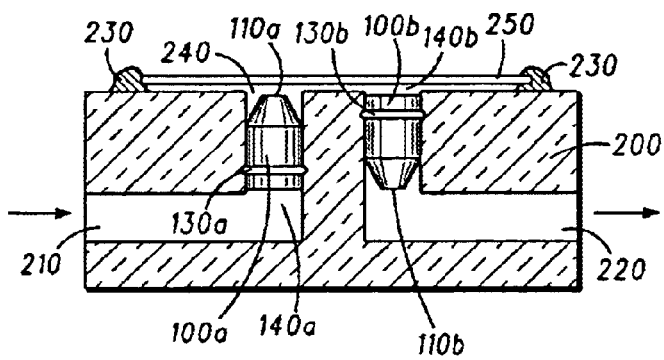
FIG. 2 representatively illustrates a piezoelectrically actuated micropump system utilizing the passive check valve of FIG. 1 in accordance with an exemplary embodiment of the present invention.

FIG. 2 generally depicts two passive check valves 100a, 100b disposed within an exemplary monolithic package substrate 200. The device package 200 generally comprises an input microfluidic channel 210, an output microfluidic channel 220 and a piezoelectric micropump element 250. In a representative and exemplary embodiment, piezoelectric element 250 may be secured to the package substrate 200 by, for example, epoxy 230. Various other means for attaching piezoelectric element 250 to the package substrate 200 include, for example: solder, adhesive and/or such other attachment means and/or methods whether now known or hereafter described in the art. In yet another exemplary embodiment of the present invention, piezoelectric micropump element 250 may alternatively be integrated within the package substrate; for example, between ceramic layers in a position substantially internal to the device package. In yet a further exemplary embodiment, the present invention may provide for integration external to the device package and/or surface mounted to the device package.

As electric current is supplied to the piezoelectric element 250, the piezoelectric element 250 operates as a deformable diaphragm membrane whose deformation (e.g., "stroke volume") causes oscillating over- and under-pressures in pump chamber 240. Pump chamber 240, in an exemplary embodiment, may be bounded by two passive check valves 100a, 100b. The pump actuation mechanism need not be limited to piezoelectric actuation, but may alternatively, sequentially or conjunctively be driven by electrostatic or thermopneumatic actuation or such other means and/or methods now known, subsequently derived or otherwise hereafter described in the art.

During the movement of the diaphragm element (i.e., piezoelectric element 250) in a direction which tends to enlarge the pump chamber volume, an under-pressure is generated in pump chamber 240 causing fluid to flow through the inlet channel 210 into valve inlet 140a of check valve 100a in a flow direction which causes the valve's outlet slit 110a to dilate thereby permitting fluid to enter into pump chamber 240. Since the fluid transport gradient during the under-pressure stroke is anti-parallel to the fluid flow acceptance conformation of check valve 100b, the outlet slit 110b of check valve 100b constricts so as to at least partial reduce the occurrence of fluid disposed in outlet channel 220 re-entering pump chamber 240 (e.g., backflow). Accordingly, this component of the pump cycle is termed the "supply mode" or the "supply stroke".

In the alternate and next phase of the stroke cycle, the movement of the diaphragm element in a direction which tends to reduce the pump chamber volume causes an over-pressure to be generated in pump chamber 240, thereby flowing fluid through the outlet 110b of check valve 100b as a result of fluid flowing out of pump chamber 240 into valve inlet 140b in a flow direction which causes the valve's outlet slit 110b to dilate thereby permitting fluid to enter into outlet channel 220. Since the fluid transport gradient during the over-pressure stroke is anti-parallel to the fluid flow acceptance conformation of check valve 100a, the outlet slit 110a of check valve 100a constricts so as to at least partial reduce the occurrence of fluid disposed in pump chamber 240 from back-flowing into the inlet channel 210. Accordingly, this component of the pump cycle is termed the "pumping mode" or the "delivery stroke".

The volume of the pump chamber upon relaxation of the actuation diaphragm is known as the dead volume $V_0$ and the volume the actuation membrane deflects during a pump cycle generally defines the stroke volume $\Delta V$. The ratio between the stroke volume and dead volume may be used to express the compression ratio $\epsilon$. Due in part to the relatively small stroke of micro-actuators and the relatively large dead volume, the compression ratio $$\varepsilon = \frac{\Delta V}{V_0}$$

is usually relatively small.

The pressure cycles (e.g., "pressure waves") generated from the actuation supply and pump modes typically operate to switch the valves. In the limit of the pump chamber 240 being filled with an ideally incompressible fluid, the pressure waves would ideally propagate from the actuation diaphragm to the valves with no net pressure loss—in which case, the compression ratio is generally not regarded as an important metric of pump performance and/or efficiency. However, where the fluid medium is not ideally incompressible, there exists a compressibility factor $\kappa>0$ which may be employed to characterize the tendency of a real fluid to dampen the propagation of the actuation pressure wave $\Delta p$. If the pressure change $\Delta p$ falls below a certain value $p'$ (e.g., the threshold pressure differential for actuation of a valve), the pump generally will not properly operate. Accordingly, a minimum condition for operation of any micropump may be expressed as $|\Delta p| \geq |p'|$.

Given the compressibility $\kappa$ of a liquid, the pressure change $\Delta p$ may be calculated (if the volume change $\Delta V$ induced by the actuator is known) in accordance with the equation $V_0 + \Delta V = V_0 (1 - \kappa \Delta p)$. If this expression is substituted into those previously presented, the compressibility ratio $\epsilon$ for liquid micropumps may be expressed as $\epsilon_{liquid} \geq \kappa |p'|$. Accordingly, a threshold valve actuation pressure $p'$ of 1 kPa in combination with the compression ratio for water $\kappa_{water}$ ($5*10^{-9}$ m$^2$/N) would yield a minimum compression ratio $\epsilon_{water}$ of $5*10^{-6}$. In this case, where the stroke volume $\Delta V$ is assumed to be 50 nl, the dead volume $V_0$ generally may not exceed 10 ml. Skilled artisans, however, will appreciate that the preceding example will generally only hold true where the pump chamber 240 is completely filled with liquid and no degassing and/or bubble occlusion occurs during micropump operation and therefore provides a first-order approximation for the determination of operational parameters and/or design specifications.

In the case of a gas pump, assuming an ideal gas having an adiabatic coefficient of $\gamma$ (1.4 for air), at atmospheric pressure $p_0$ and an actuation pressure wave of magnitude $\Delta p$, the following expression may be obtained:

$$p_0 V_0^\gamma = (p_0 + \Delta p)(V_0 + \Delta V)^\gamma$$

Accordingly, it may be shown that the criterion for the compression ratio of a gas micropump may be similarly derived as $$\varepsilon_{gas} \geq \left(\frac{p_0}{p_0 - |p'|}\right)^{\frac{1}{\gamma}} - 1$$

and, in the case of isothermal state transitions, the adiabatic coefficient $\gamma$ may be taken as equal to unity. For the device previously presented for the micropumping of water (e.g., $p'=1$ kPa and $\Delta V=50$ nl), the dead volume $V_0$ for the same system adapted for the micropumping of air must generally not exceed 5 $\mu$l.

In conventional micropump operation, gas bubbles may often remain in the pump chamber during the priming procedure or the liquid may even volatized in response to temperature changes during operation. In these cases, the expression for the compression ratio of a liquid $\epsilon_{liquid} \geq \kappa|p'|$ will no longer hold true since the compressibility of the gas bubble is generally much larger than the compressibility of the liquid. Depending on the volume of the gas bubble, the actuation pressure wave will be dampened in an amount that may be calculated if the volume of the gas bubble is substituted for the dead volume in the appropriate equation presented vide supra. If the gas bubble volume becomes so large that the actuation pressure wave falls below the threshold valve actuation pressure, the micropump will fail. Consequently, in the limit of the entire pump chamber volume being filled with a gas, the operational design criteria for liquid self-priming pumps converges to the design criteria for those of gas micropumps.

Additionally, in practical applications, the design criteria may even need to be more stringent to account for higher-order fluid dynamics. For example, self-priming liquid micropumps must typically suck the liquid meniscus from the inlet 210 into the pump chamber 240, thereby increasing the threshold critical pressure p' in parity with the surface tension of the meniscus at the juncture between and/or within, for example, the microfluidic channels and the microfluidic valves. Those skilled in the art will recognize that other fluid dynamics and/or parametric contributions may require consideration in the determination of optimal operational specifications for a micropump in accordance with the present invention as they may be employed in a variety of practical applications and/or operating environments. The same shall be regarded as within the scope and ambit of the present invention.

Figure 3:
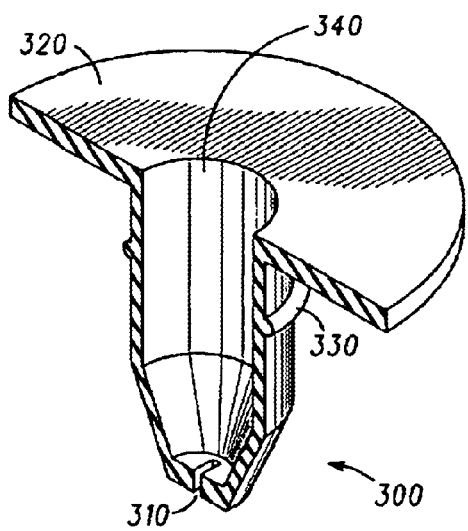
FIG. 3 depicts a cut-away section of a representative passive check valve in accordance with another embodiment of the present invention.
Figure 4:
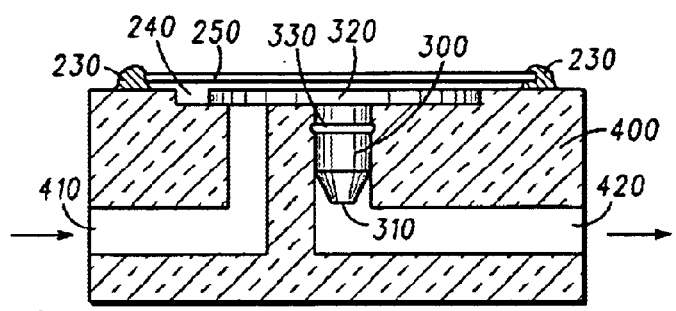
FIG. 4 representatively illustrates a piezoelectrically actuated micropump system utilizing the passive check valve of FIG. 3 in accordance with yet another exemplary embodiment of the present invention.

In an alternative embodiment, in accordance with another exemplary aspect of the present invention as representatively depicted, for example, in FIG. 3, a passive check valve 300 may be provided with a substantially flexible flap 320 distally located from valve outlet 310 and annularly peripheral or otherwise concentric to valve inlet 340. This combination "umbrella"/"duck-bill" valve design has the benefit of inter alia generally requiring only one substantially unitary valving element for effective valve actuation and device operation as representatively illustrated, for example, in FIG. 4. During the movement of the diaphragm element (i.e., piezoelectric element 250) in a direction which tends to enlarge the pump chamber 240 volume, an under-pressure is generated in pump chamber 240 causing peripheral flap 320 to distend in a direction toward diaphragm element 250 thereby opening inlet channel 410 to permit fluid to enter into pump chamber 240. Since the fluid transport gradient during the under-pressure stroke is anti-parallel to the fluid flow acceptance conformation of check valve 300, the outlet slit 310 of check valve 300 constricts so as to at least partially reduce the occurrence of fluid disposed in outlet channel 420 re-entering via backflow into pump chamber 240.

In the alternate next phase of the stroke cycle, the movement of the diaphragm element 250 in a direction which tends to reduce the pump chamber volume causes an over-pressure to be generated in pump chamber 240 thereby causing fluid to flow through the outlet 310 of check valve 300 as a result of fluid flowing out of pump chamber 240 into valve inlet 340 of check valve 300 in a flow direction which causes the valve's outlet slit 310 to dilate thereby permitting fluid to enter into outlet channel 420. Since the fluid transport gradient during the over-pressure stroke tends to press the peripheral "umbrella" flap 320 down against the pump chamber wall in the vicinity of inlet channel 410, the effect is to at least partially reduce the occurrence of fluid disposed in the pump chamber 240 from back-flowing into the inlet channel 410. Those skilled in the art will appreciate various other geometries and/or arrangements of multiple valve components may be otherwise employed to achieve substantially the same result as the exemplary embodiments disclosed herein. The same shall be regarded as within the scope and ambit of the present invention.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

What is claimed is:

1. A microfluidic pumping system, comprising:

a plurality of ceramic substrate layers comprised of green sheets formed of a ceramic material dispersed in an organic binder;

a pumping cavity, a fluid inlet channel, a fluid outlet channel, and at least one of a pump actuator and a piezoelectric actuator formed in the plurality of ceramic substrate layers; and a passive check valve placed in fluidic communication with the fluid inlet channel and the fluid outlet channel, the passive check valve comprising a valve housing, including an inlet opening and an outlet opening, said inlet opening suitably adapted to receive inlet fluid for transport through said valve housing, said valve housing effectively confining transport of inlet fluid from said inlet opening to said outlet opening where outlet fluid is purged, said outlet opening comprising passive means for substantially restricting backflow of purged outlet fluid back into the valve housing and a means for retaining the passive check valve within the plurality of ceramic substrate layers.

2. The microfluidic pumping system of claim 1, wherein said means for restricting the backflow of purged outlet fluid comprises:

means for effectively dilating said outlet opening when the direction of fluid pressure tends to flow fluid in a direction away from said inlet opening through said valve housing toward said outlet opening; and means for effectively constricting said outlet opening when the direction of fluid pressure tends to flow fluid in a direction away from said outlet opening through said valve housing toward said inlet opening.

3. The microfluidic pumping system of claim 1, wherein said means for restricting the backflow of purged outlet fluid comprises a duck-bill valve.

4. The microfluidic pumping system of claim 1, wherein said retaining means comprises a substantially annular retaining ring.

5. The microfluidic pumping system of claim 1, further comprising an substantially flexible umbrella flap distally located from said outlet opening and annularly peripheral to said inlet opening.

6. The microfluidic pumping system of claim 1, wherein said pump actuator comprises at least one of a unimorphic piezoelectric element and a bimorphic piezoelectric element.

7. The microfluidic pumping system of claim 1, further comprising a plurality of microfluidic pumps in fluidic communication with each other.

8. The microfluidic pumping system of claim 7, wherein said fluidic communication of said microfluidic pumps comprises at least one of a series configuration and a parallel configuration.

9. A method of fabricating a multilayer micropump device comprising:

providing a plurality of ceramic substrate layers comprised of green sheets formed of a ceramic material dispersed in an organic binder;

forming into said plurality of ceramic substrate layers a channel and a cavity, said channel and said cavity in microfluidic communication to define a fluid channel and a pumping cavity;

placing within said fluid channel a passive check valve comprising:

a valve housing, including an inlet opening and an outlet opening;

said inlet opening suitably adapted to receive inlet fluid for transport through said valve housing;

said valve housing effectively confining transport of inlet fluid from said inlet opening to said outlet opening where outlet fluid is purged;

said outlet opening comprising passive means for substantially restricting backflow of purged outlet fluid back into the valve housing; and a means for retaining the passive check valve within a microfluidic channel; and laminating each of the plurality of ceramic substrate layers to form a substantially monolithic micropump device.

10. The method of claim 9, wherein the step of forming said channel and said cavity in said plurality of ceramic layers comprises at feast one of mechanically punching and laser drilling into each ceramic layer.

11. The method of claim 10, further comprising the step of sintering said ceramic layers to form said monolithic package.

12. The method of claim 11, further comprising the step of providing a pumping actuator element on a surface of said monolithic package, said pumping actuator suitably adapted to exert a pumping force as a result of application of a voltage to the monolithic micropump package.

13. The method claim 11, further comprising the step of providing a pumping actuator element embedded in said monolithic package, said pumping actuator suitably adapted to exert a pumping force as a result of application of a voltage to the monolithic micropump package.

* * * * *